United States Patent
Mailliet et al.

(10) Patent No.: US 6,210,144 B1
(45) Date of Patent: Apr. 3, 2001

(54) CLOSING UNIT FOR INJECTION MOLDING MACHINE

(75) Inventors: Pierre Mailliet, deceased, late of Redange (LU); by Monique Mailliet, executrix, Peppange; by Marc Mailliet, executor, Bettembourg, both of (LU)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 08/981,090

(22) PCT Filed: Jun. 10, 1996

(86) PCT No.: PCT/EP96/02505

§ 371 Date: Apr. 28, 1998

§ 102(e) Date: Apr. 28, 1998

(87) PCT Pub. No.: WO96/41710

PCT Pub. Date: Dec. 27, 1996

(30) Foreign Application Priority Data

Jun. 12, 1995 (LU) .......................................................... 88622

(51) Int. Cl.[7] .................................................. B29C 45/64
(52) U.S. Cl. ...................... 425/150; 425/451.9; 425/589; 425/595
(58) Field of Search .................................. 425/150, 589, 425/595, 451.9

(56) References Cited

U.S. PATENT DOCUMENTS

| | | | |
|---|---|---|---|
| 4,304,540 | * 12/1981 | Hammon | 425/595 |
| 4,504,208 | * 3/1985 | Kurumaji et al. | 425/595 |
| 4,874,309 | * 10/1989 | Kushibe et al. | 425/595 |
| 5,135,385 | * 8/1992 | Fukuzawa et al. | 425/595 |
| 5,192,557 | * 3/1993 | Hirata et al. | 425/595 |
| 5,338,171 | * 8/1994 | Kayakawa et al. | 425/595 |
| 5,417,913 | 5/1995 | Arend | 264/328 |
| 5,645,875 | * 7/1997 | Glaesener et al. | 425/589 |
| 5,853,773 | * 12/1998 | Choi | 425/595 |

FOREIGN PATENT DOCUMENTS

| | | |
|---|---|---|
| 1009484 | 5/1957 | (DE) . |
| 1155885 | 10/1963 | (DE) . |
| 418535 | 2/1967 | (DE) . |
| 3323931 | 1/1985 | (DE) . |
| 0513572 | 11/1992 | (EP) . |
| 1548751 | 3/1967 | (FR) . |
| 2256828 | 8/1975 | (FR) . |
| 2390271 | 8/1978 | (FR) . |
| 1299781 | 12/1972 | (GB) . |
| 2064415 | 6/1981 | (GB) . |
| 61-199920 | 9/1986 | (JP) . |
| 5-24086 | 2/1993 | (JP) . |
| 93/16828 | 9/1993 | (WO) . |

* cited by examiner

*Primary Examiner*—James P. Mackey
(74) *Attorney, Agent, or Firm*—Fitzpatrick, Cella, Harper & Scinto (57) ABSTRACT

A closing unit for an injection moulding machine has a movable closing die and a fixed matching die designed as clamping dies for an injection mould, as well as several hydraulic cylinders mounted on the fixed matching die to apply a closing force. A servo-drive allows the drawbars to swivel around their longitudinal axes up to a first and second angular position. A first locking device arranged on the drawbars along a first section A of the drawbars co-operates with second locking device arranged on the movable closing die. In the first angular position of the drawbars, the locking devices allow the movable closing die to move axially with respect to the drawbars, and in a second angular position of the drawbars they transmit the required closing force.

29 Claims, 10 Drawing Sheets

CLOSING UNIT FOR INJECTION MOLDING MACHINE

BACKGROUND OF THE INVENTION

1. Field of the Invention

The present invention relates to a closing unit for an injection molding machine.

2. Related Art

The closing unit of an injection molding machine receives the injection mold. It carries out the movements necessary for the closing and opening of the injection mold and produces the forces necessary for the locking and opening of the injection mold. The main components of each closing unit are a stationary plate on the injection side (hereinafter referred to as the injection plate), a movable closure plate, as well as a locking device. One part of the injection mold is clamped on the stationary injection plate while the complementary part of the injection mold is clamped on the movable closure plate. By locking device there is to be understood the device which, upon the injection and further pressing, produces the necessary closing force for keeping the injection mold closed.

Both mechanical locking devices with lever mechanisms and hydraulic locking devices with hydraulic cylinders are known.

The present invention relates to a closing unit with hydraulic locking. In the book "Kunstsfoff-Maschinen-Führer," 3rd edition, edited by Dr. Eng. Friedrich Johannabe, published by Carl Hanser Verlag (Munich, Vienna), 1992 various constructions of closing units with hydraulic locking are described.

In most closing units with hydraulic locking, a force cylinder is developed as a pressure cushion and is arranged on a support plate behind the movable closure plate.

From FIG. 56, page 110, of said book, a closing unit having four hydraulic cylinders on the stationary injection plate is, however, known. The pistons of these hydraulic cylinders are connected rigidly via connecting rods with the movable closure plate. The four hydraulic cylinders produce the required closing force but also, at the same time, carry out the opening and closing movements of the movable closure plate. Since the four hydraulic cylinders at the same time perform a locking function and a displacement function, they must be both of large cross section and have a large stroke and they therefore take up a relatively large amount of space. The four relatively large hydraulic cylinders accordingly substantially impede access to the injection unit and furthermore have a very high consumption of oil. The structural length of the closing unit is substantially greater than the greatest possible distance between the injection plate and the closure plate.

From FIG. 53B, page 108, of the same book, a more compact closing unit, also having four hydraulic cylinders on the stationary injection plate, is known. The four connecting rods are detachably connected by claws at their ends to the corresponding hydraulic cylinder. Opening and closing movements are produced, with connecting rods uncoupled, by high-speed cylinders arranged on the side. The stroke of the four hydraulic cylinders in this construction must accordingly correspond merely to the difference in length between the largest and smallest injection molds. This construction is primarily of interest when the injection molds used all have more or less the same length. If the closing unit, however, is to be used with injection molds of different length, the stroke of the hydraulic cylinders must be relatively large and the closing unit of FIG. 53B has substantially the same disadvantages as the aforementioned closing unit of FIG. 56.

The object of the present invention is to create a compact closing unit which is suitable for injection molds of different length. The object is achieved by a closing unit in accordance with claim 1.

SUMMARY OF THE INVENTION

The closing unit of the invention comprises, in known manner, a fixed injection plate with injection opening and a movable closure plate, these plates forming, for instance, clamping plates for an injection mold. A displacement device for the movable closure plate produces the opening and closing movements and makes it possible to position the movable closure plate relative to the fixed injection plate. Several hydraulic force cylinders, preferably four, are arranged on the stationary injection plate and produce the closing force. This closing force is transmitted by connecting rods, each of which is connected mechanically with the piston of a force cylinder to the movable closure plate. The closing unit of the invention differs from the known closing unit, which has the features indicated above, primarily by the fact that the connecting rods are turnable around their longitudinal axes into a first and a second angular position, first locking means being arranged along a rod section A on the connecting rods and second locking means being arranged on the movable closure plate, and these first and second locking means being developed complementary to each other in such a manner that in the first angular position of the connecting rods they make and axial displacement of the movable closure plate relative to the connecting rods possible and that in the second angular position of the connecting rods the first locking means in the rod section A on the connecting rods cooperate with the second locking means on the movable closure plate to transmit the necessary closing force.

The closing unit of the invention permits an extremely compact, space-saving construction. The required stroke of the force cylinders and thus their outside dimensions are minimum. As compared with known closing units, the closing unit of the invention is characterized by a very small structural length. The structural length of the closing unit need in fact not be substantially larger than the greatest possible distance between the injection plate and the closure plate. The hydraulic connections for the force cylinders and the displacement device of the closure plate can be arranged on the fixed injection plate. Flexible hydraulic connections are, accordingly, not required. Therefore the closing unit is excellently suited for receiving injection molds of different length. The range of length of the injection molds is limited here solely and exclusively by the length of the rod section A having the first locking means.

The first locking means advantageously comprise an outer toothing on the connecting rod, and the second locking means comprise a locking bushing which is fastened fixed for rotation on the movable closure plate and has an inner toothing. Inner toothing and outer toothing are divided by longitudinal grooves into at least two rows of teeth. In the first angular position, the rows of teeth of the outer toothing can be passed through axially by longitudinal grooves of the inner toothing and the rows of teeth of the inner toothing can be passed through axially by the longitudinal grooves of the other toothing, so that an axial displacement of the movable closure plate relative to the connecting rods can take place. In the second angular position, the teeth of the inner toothing, on the other hand, can engage behind the teeth of the outer toothing for the transmission of a pulling force.

The teeth of the inner and outer toothings can be arranged annularly or helically. In order to assure a dependable engagement of the outer toothing in the inner toothing, a substantially axial flank clearance should be developed between inner and outer toothings. A large flank clearance, however, also has substantial disadvantages. Thus, for example, the operating stroke of the force cylinders is increased thereby, and thus the consumption of energy by the closing unit. The flows through the force cylinders are considerably greater so that the hydraulic system of the closing unit must also be made larger. Furthermore, the unlocked connecting rods are relatively strongly accelerated upon overcoming a large flank clearance, so that the teeth of the inner toothing strike with great force against the teeth Of the outer toothing.

Within the scope of this invention, however, there is proposed an extremely simple and inexpensive solution which completely eliminates the disadvantages of a large axial flank clearance. This solution consists essentially therein that the piston of the hydraulic force cylinder is coupled by a screw thread to the connecting rod in a very simple manner and that the piston is secured against turning. Upon turning of the connecting rod by an angle γ from the first angular position into the second angular position, the connecting rod accordingly experiences an advance X relative to the fixed piston. The pitch of the screw thread is then so designed that by turning the connecting rod from the first angular position into the second angular position, the existing axial flank clearance S between inner and outer toothings is distributed on one side in such a manner that no substantial flank clearance is present any more between the tooth flanks which are to transmit the force. If, in this connection, the actuator for the turning of the connecting rods is so designed that it can place the connecting rods into a second angular position both by counterclockwise rotation and by clockwise rotation, then the flank clearance S between inner and outer toothings is distributed, depending on the direction of rotation, on the one hand to the left side, and on the other hand to the right side. The toothings are accordingly automatically without clearance for the transmission of the closing force in the first direction of rotation and automatically without clearance for the transmission of an opening force to the closure plate in the second direction of rotation.

The movable closure plate advantageously has rotatably mounted slide shoes as radial guide for the connecting rods. The longitudinal grooves in the outer toothing form guide surfaces for these slide shoes, which are extended beyond the rod section A. The slide shoes are turnable with the connecting rod.

One very advantageous embodiment of the actuator as well as a very advantageous hydraulic control of the closing unit will be described inter alia in the following detailed description.

BRIEF DESCRIPTION OF THE DRAWINGS

Embodiments, as well as various features and advantages, of the invention will be described in detail with reference to the figures of the accompanying drawings, in which.

DETAILED DESCRIPTION OF THE PRESENTLY PREFERRED EXEMPLARY EMBODIMENTS

Figure 1:
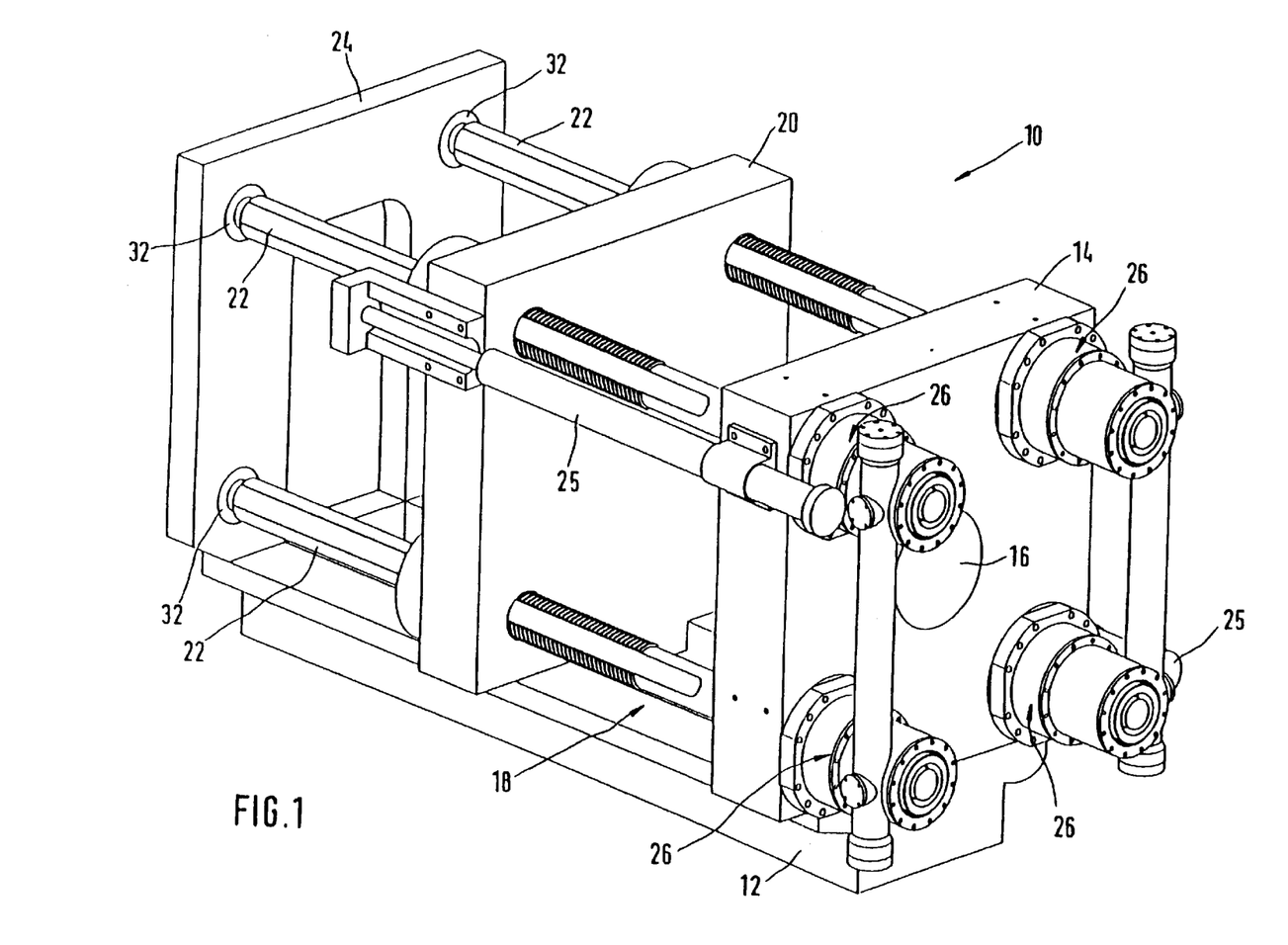
FIG. 1 is a view of closing unit in accordance with the invention.

The general construction of a closing unit 10 in accordance with the invention will be explained with reference to FIGS. 1 and 2. An injection plate 14 having a central injection opening 16 is rigidly mounted on a base 12. The base 12 forms a guide bed 18 for a movable closure plate 20. The complementary halves of an injection mold (not shown) are clamped to injection plate 14 and closure plate 20. The movable closure plate 20 is displaceable via an actuating device which comprises, for instance, two laterally arranged displacement cylinders 25 movable between injection plate 14 and an end plate 24. It is guided in this connection in the base 12. The displacement cylinders 25 accordingly open and close the complementary halves of the injection mold by displacement of the closure plate 20 relative to the injection plate 14. The housing of the displacement cylinders 25 is fastened in each case on the stationary injection plate 14 so that both displacement cylinders 25 have a rigid hydraulic connection on the fixed end plate 14.

Four connecting rods 22 extend from the stationary injection plate 14 through the movable closure plate 20 up to the end plate 24 which is also mounted fixed on the base 12. In the end plate 24 connecting rods 22 are guided in axially displaceable manner in slide bushings 32. On the stationary injection plate 14, there is associated with each connecting rod 22 a force cylinder 26 the housing of which is rigidly connected to the injection plate 14.

Figure 2:
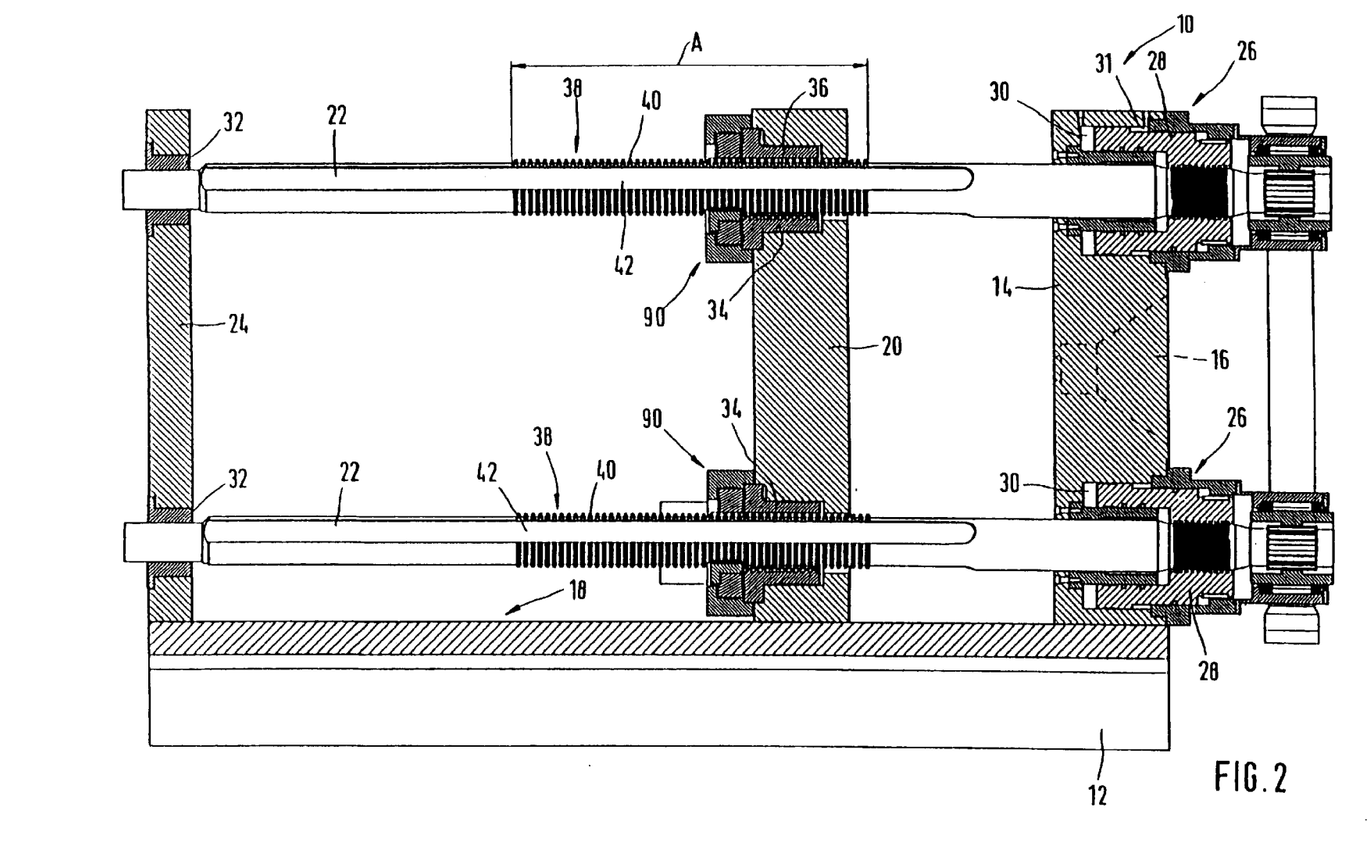
FIG. 2 is a longitudinal section through the closing unit of FIG. 1.

In FIG. 2 it can be seen that each of these force cylinders 26 comprises an annular piston 28 which is mechanically attached to the connecting rod 22. A first pressure chamber 30 on the front side is axially limited on the one hand by the injection plate 14 and on the other hand by the piston 28. If, this first pressure chamber 30 is placed under pressure, then the piston 28 exerts an axial pulling force on the connecting rods 22, whereby the force of reaction is taken up by the stationary injection plate 14. This first pressure chamber 30 produces the closing force necessary for locking the injection mold. Within a second pressure chamber 31, the piston 28 forms a substantially smaller pressure surface as shoulder surface. If this second pressure chamber 31 is placed under pressure and the first pressure chamber relieved of pressure, then the piston 28 exerts an axial pressing force on the connecting rods 22 in the direction opposite the closing force described above. This pressing force serves to open the mold after the casting.

In the movable closure plate, each connecting rod 22 passes through a locking bushing 34 having first locking means 36. Second locking means 38, which are complementary to the first locking means, are provided along a rod section A on the connecting rod 22. These first and second locking means 36 and 38 as so developed that in a first angular position of the connecting rod 22, the latter can be passed through axially by the locking bushing 34, that the second locking means, however, can be brought by turning the connecting rod 22 into a second angular position in which it cooperates within the rod section A with the first locking means in order to transmit the necessary closing force.

For the closing of the injection mold by displacement of the movable closure plate 20 by means of the displacement cylinders 25, the second locking means 38 are in the first angular position. In this first angular position, the connecting rods 22 slide upon displacement of the closure plate 20 axially through the locking bushings 34. Thereupon, the connecting rods 22 are locking in the locking bushings 34 of the movable closure plate 20 by turning from the first angular position into the second angular position. The four force cylinders 26 can now transmit the required closing force via the connecting rods 22 to the closure plate 20, i.e. pull the closure plate 20 in the direction towards the injection plate 14.

One advantageous embodiment of the locking means will be described in further detail with reference to FIGS. 2 to 8. The locking means on the connecting rod 22 advantageously comprise (see FIGS. 2 and 5) an outer toothing 40 which is divided by longitudinal grooves 42 into three axial rows of teeth $40_1$, $40_2$, $40_3$, in which the teeth of the outer toothing are arranged in each case in the same shape as and parallel to each other. The locking bushings 34 (see FIGS. 2 and 6) comprise a complementary inner toothing, which is also divided by longitudinal grooves $44_1$, $44_2$, $44_3$, into three axial rows of teeth $46_1$, $46_2$, $46_3$, in which the teeth of the inner toothing are arranged in each case in the same shape as and parallel to each other. The longitudinal grooves $42_i$ in the outer toothing of the connecting rod 22 are somewhat wider than the teeth $46_i$ of the locking bushing 34, and the longitudinal grooves $44_i$ in the inner toothing of the locking bushing 34 are somewhat wider than the teeth $40_i$ of the connecting rod 22.

Figure 3:
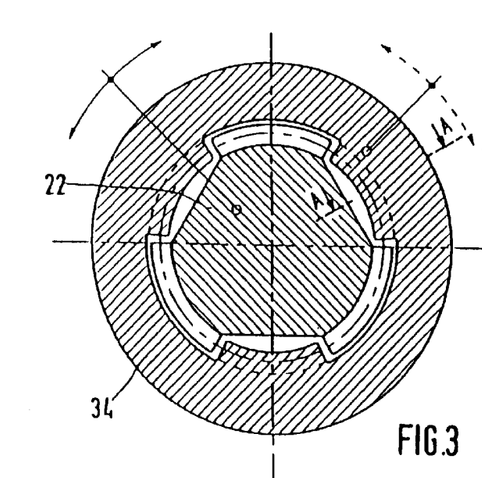
FIGS. 3 and 4 are a cross section through a connecting rod and a locking bushing of the closing unit of FIG. 1.
Figure 7:
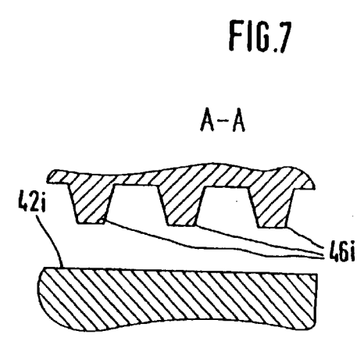
FIG. 7 is a section along the section line A—A of FIG. 3.

In a first angular position of the connecting rod, shown in FIG. 3, the teeth $46_i$ of the outer toothing of the rack 22 lie in the longitudinal grooves $44_i$ of the locking bushing 34. In this angular position the connecting rod 22 can be pushed through the locking bushing 34, the teeth $40_i$ of the outer toothing being guided by the longitudinal grooves $44_i$ of the inner toothing, and the teeth $46_i$ of the inner toothing being guided by the longitudinal grooves $42_i$ of the outer toothing. FIG. 7 shows, in a cross section along the section line A—A of FIG. 3, the teeth of the inner toothing in the longitudinal grooves of the outer toothing.

Figure 4:
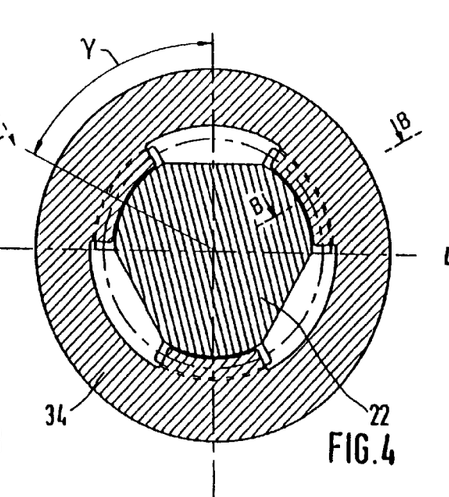
Figure 5:
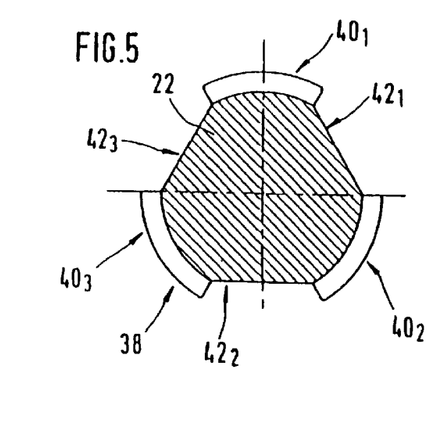
FIG. 5 is a cross section through the connecting rod.
Figure 6:
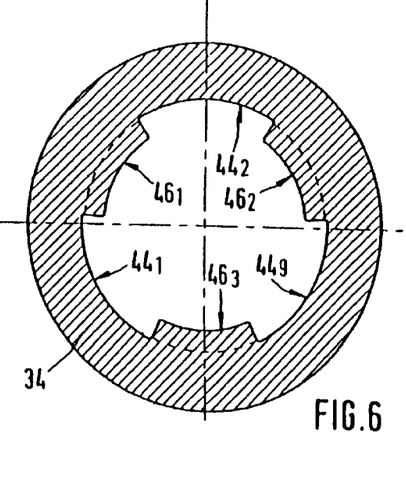
FIG. 6 is a cross section through the locking bushing.

In a second angular position—see FIG. 4—after the turning of the connecting rod 22 by an angle $\gamma=180°/n$ (n=number of longitudinal grooves or of rows of teeth), the teeth $46_i$ of the connecting rod 22 are located axially between the teeth $40_i$ of the locking bushing 34. In this second angular position, therefore, the rows of teeth of the inner toothing engage into the rows of teeth of the outer toothing for the transmission of the necessary closing force.

Figure 8:
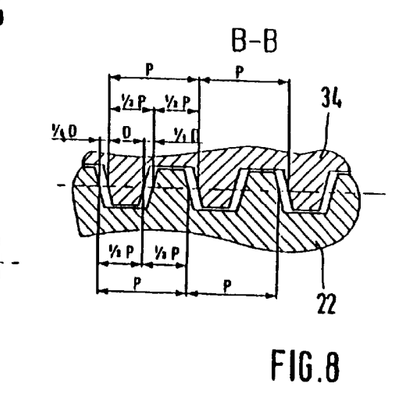
FIG. 8 is a section along the section line B—B of FIG. 4.

FIG. 8 shows a section along the section line B—B of FIG. 4. It can be seen that the teeth of the outer and inner toothings have a trapezoidal cross section. The toothings can be developed helically, i.e. the teeth are arranged along a helical line, and the toothings accordingly form a thread having a pitch P. The toothings can, however, also be annular, i.e. the teeth can form parallel rings which are arranged in each case at a distance P apart (also called pitch P).

In order that the outer toothing can engage into the inner toothing upon the turning of the connecting rod 22, the teeth $46_i$ of the inner toothing must, of course, be axially between the teeth $40_i$ of the inner toothing in the first angular position of the connecting rod. In order that small errors in position of the movable closure plate do not prevent engagement of the inner toothing into the outer toothing, a relatively large axial flank clearance is desired between the inner toothing and the outer toothing.

From FIG. 8 it can be seen that $P=2D+S$ in which:

P=pitch;

D=average tooth width;

S=axial flank clearance.

In practice, it has proven to be advantageous for S to be equal to 0.5D, and therefore P to be equal to 2.5D.

The extremely high closing force is transmitted by four connecting rods 22 via the locking bushings 34 to the movable closure plate 20. In addition, the frequency in actual practice of the closings and openings is very high. In other words, the material is subjected to substantial changes in stress with high frequency. In this way, permanent deformations can occur which impair the operation of the locking device. In order to reduce the negative effects of such permanent deformations on the locking function, the following measures can advantageously be taken:

a) The locking bushings 34 are so fastened to the movable closure plate that they are under tensile stress upon transmission of the closing force. In this way, the result is obtained that both the connecting rods 22 and the locking bushings 34 are lengthened in the same direction, i.e. are uniformly deformed.

b) The cross sections of the locking bushings 34 and of the connecting rods 22 should be so developed that they are subjected to approximately the same tensile stresses upon transmission of the closing force.

c) With the same tooth geometry, the base of the teeth of the outer toothing should be approximately equal to the base of the teeth of the inner toothing, so that the stress maxima at these critical places are approximately the same. This means, for instance, that the arc length (in degrees) of the teeth of the outer toothing is greater than the arc length of the teeth of the inner toothing.

d) The teeth of the outer toothing should be of greater hardness than the teeth of the inner toothing. In this connection, the flank surface of the teeth of the outer toothing should also be larger than the flank surface of the teeth of the inner toothing so that an imprint of the teeth of the outer toothing on the softer teeth of the inner toothing is avoided.

e) The elastic limit of the connecting rods 22 should be about 20% greater than the elastic limit of the locking bushings 34. In this way, in combination with measures b) and c), the result is obtained that plastic deformations upon overloading occur in particular on the locking bushings 34 and less so on the connecting rods 22. Plastic deformations on the connecting rods 22 are far more disturbing, since they namely are locally limited and therefore destroy the axial homogeneity of the outer toothing in the rod section A, which can lead to inaccuracies in the positioning of the closure plate if molds of different size are used. Furthermore, the replacement of the connecting rods 22 is far more expensive than the replacement of the locking bushings 34.

It should be pointed that measures a), b) and c) of the above enumeration have advantageous effects on the distribution of the tensile force also in the normal case of elastic deformation. The elastic deformation of the locking bushings and the elastic deformation of the connecting rods are caused by these measures to take place in the same direction and be of the same order of magnitude, so that the tensile force to be transmitted is distributed over all interengaged teeth of the outer and inner toothings.

In the description of FIG. 8, it was pointed out that substantial flank clearance has the advantage that small inaccuracies in the positioning of the closure plate 20 by the displacement cylinders 25 do not prevent engagement of the outer toothing of the connecting rods 22 into the inner toothing of the locking bushings 34. However, a substantial axial flank clearance also has essential disadvantages. First of all, the stroke of the piston 28 increases with the flank clearance S, as a result of which the consumption of oil and energy by the force cylinders becomes greater. Secondly, the connecting rods 22 are initially imparted a high acceleration when acted on with pressure by the force cylinders, so that the teeth of the outer toothing strike strongly against the teeth of the inner toothing. For this reason, it is advantageous to provide a device which reduces or eliminates the flank clearance in the direction of the transmission of force.

One extremely advantageous development of this device is described with reference to FIG. 9. The connecting rod 22 is coupled turnably to the annular piston 28 via a thread 50 (hereinafter called the screw thread 50). The latter is secured against turning, for instance by a spline 52 in a spline groove. If, accordingly, the connecting rod 22 is turned by an angle γ, it experiences an advance in the annular piston 28 of:

$$X=(\gamma/360°)P'$$

in which P' is the pitch of the screw thread 50.

The turning of the connecting rod 22 is effected via a turning device 54 which is arranged in the extension of the force cylinder 26. This turning device 54 comprises a housing 56 which is, for instance, flanged onto the housing of the force cylinder 26. A toothed bushing 58 is arranged, turnable, in two ball bearings 60, 62, within the housing 56. The toothed bushing 58 is placed on the end of the connecting rod 22 and so attached to this end via a tooth or spline-shaft connection that a moment of rotation is transmitted in form-locked manner, but at the same time an axial displacement of the connecting rod 22 in the toothed bushing 58 is possible. The angular position of the toothed bushing 58, and thus the angular position of the connecting rod 22, can be adjusted via an actuator 70 (see also FIG. 10) which engages into the outer toothing 64 of the toothed bushing 58. It should be pointed out that a pure moment of rotation is transmitted to the connecting rod 22. All radial forces which act on the toothed bushing 58 are transmitted directly by the two ball bearings' 60, 62 to the housing 56. In this way assurance is had that the screw thread 50 is not stressed further by setting forces.

Figure 10:
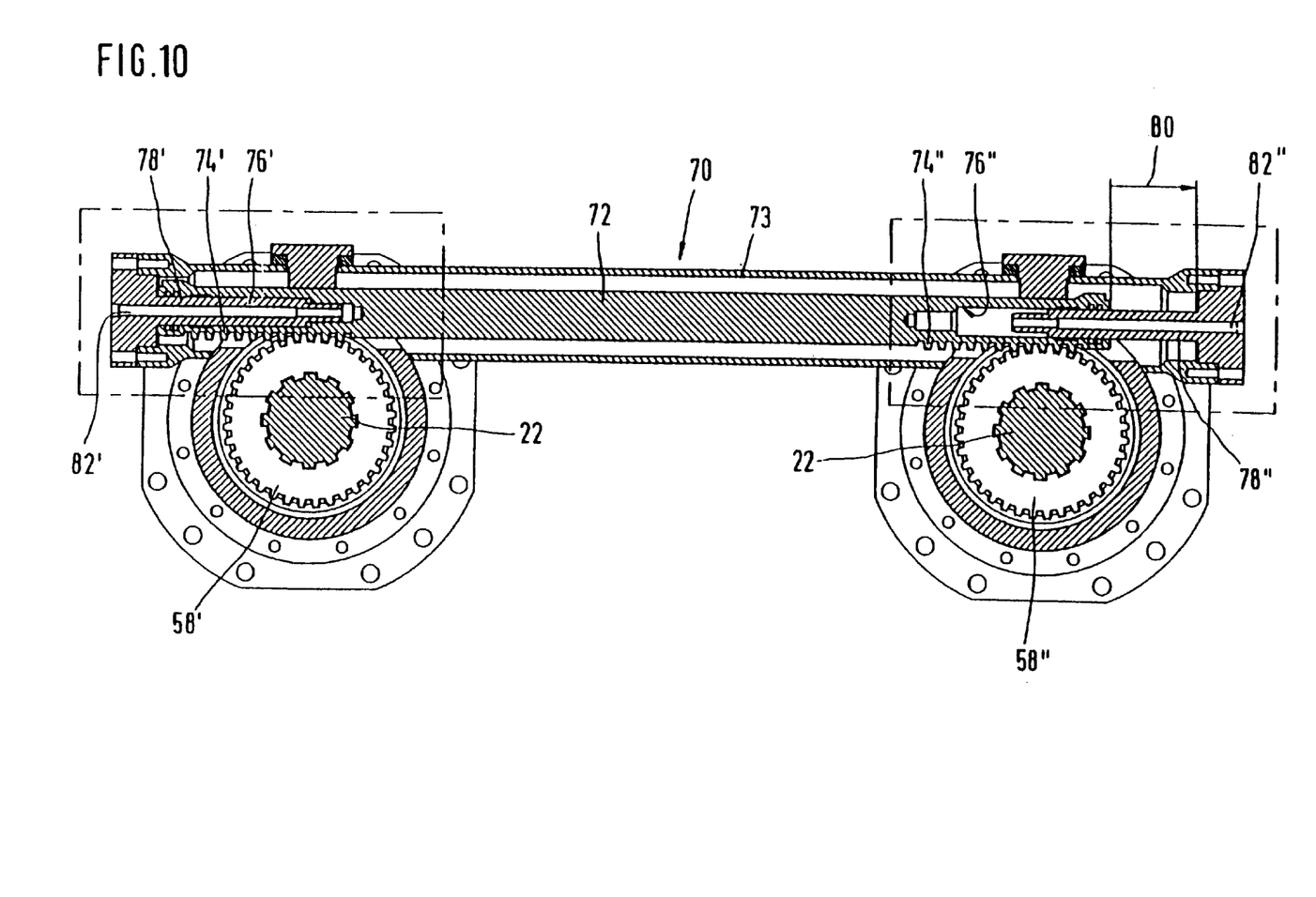
FIG. 10 is a section through an actuator for two connecting rods.
Figures 11, 12, 13, 14:
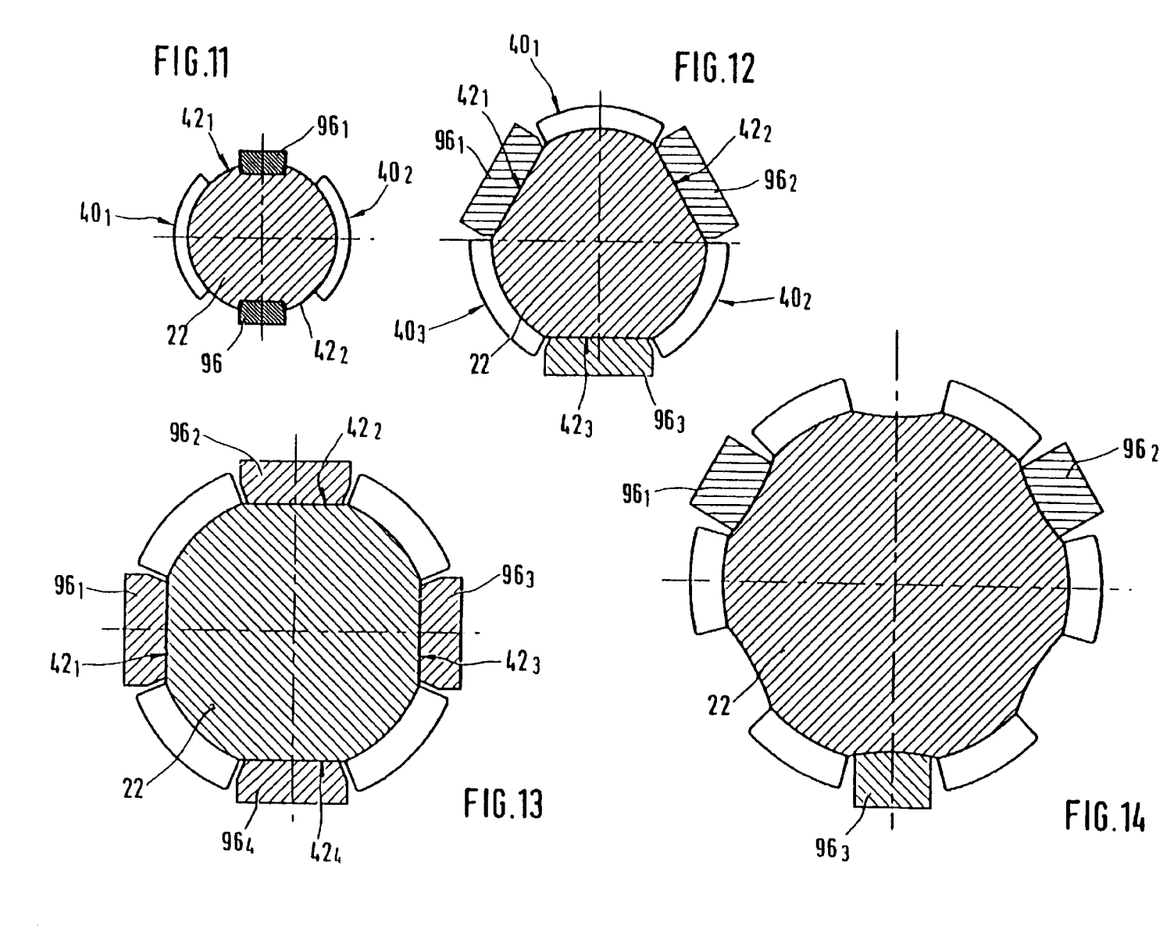
FIGS. 11 to 14 are cross sections through different embodiments of the connecting rod.

FIG. 10 shows an advantageous development of an actuator 70 for two toothed bushings 58' and 58" each. This actuator 70 comprises a rack 72, the toothing 74' of which can engage into the toothed bushing 58' and the toothing 74" of which can engage into the toothed bushing 58". The rack 72 is arranged in a housing tube 73. In each end of the rack 72 there is a cylindrical bore 76', 76". Pistons 78', 78" are introduced, sealed-off, into the respective cylinder bores 76', 76". These pistons are advantageously developed as plunger pistons. The pistons 78', 78" are flanged axially onto the two ends of the housing tube 73. The rack 72 is displaceable back and forth axially in the housing tube 73 between the two pistons 78', 78". In FIG. 10, the rack is shown resting against the left piston 78'; arrow 80 indicates the possible stroke of the rack 72 in the direction of the right piston 78".

Both pistons 78', 78", which also have a guide function for the rack 72, have an axial connecting channel 82', 82" for a pressure fluid. Via these connecting channels 82', 82", the cylinder bores 76', 76" can be acted on optionally by the pressure fluid behind the pistons 78', 78" so that two oppositely acting pressure cylinders are developed for the displacement of the rack 72. It should be noted that these two pressure cylinders are arranged directly above the toothed bushings 58', 58". In this way, the structural length of the actuator is reduced to a minimum. It should also be noted that the actuators are so designed that the connecting rods 22 are turnable in each case from the first angular position to the right and to the left by an angle γ.

Figure 9:
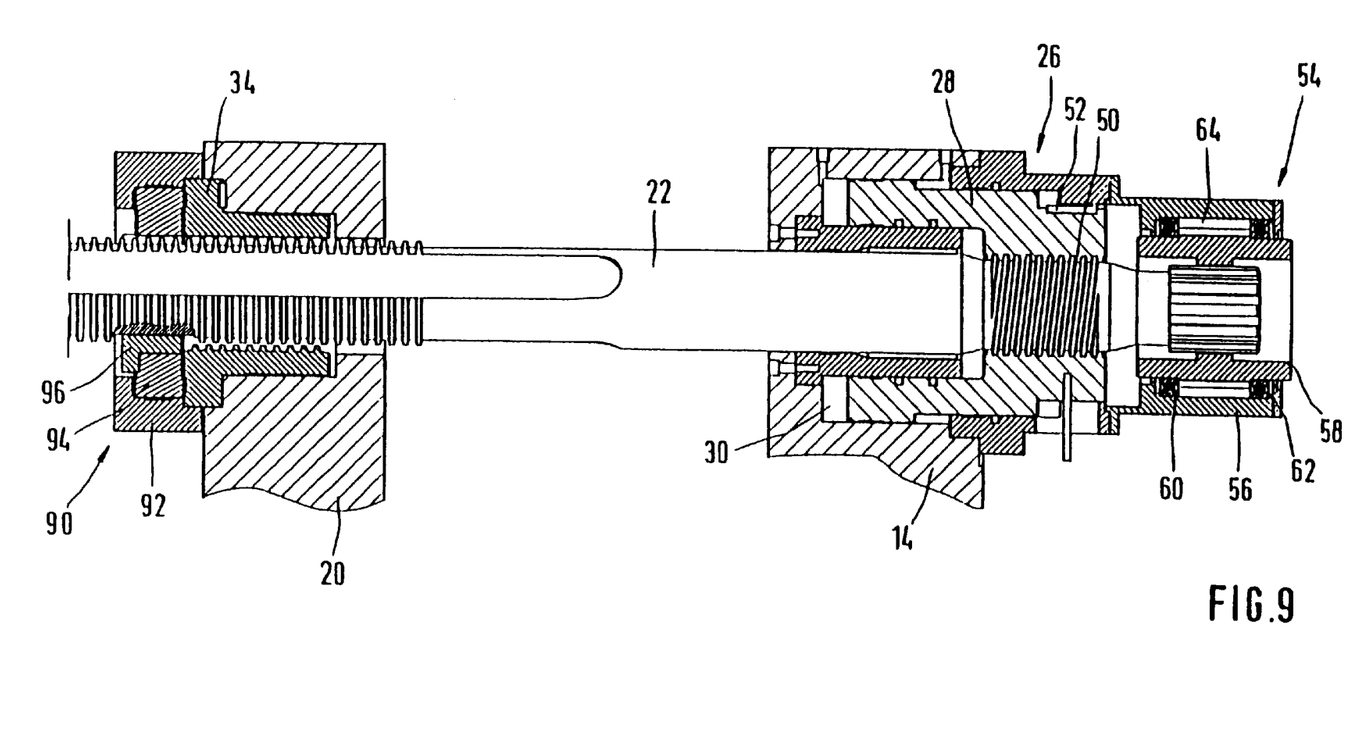
FIG. 9 is an enlargement from the longitudinal section of FIG. 2.

From FIGS. 2 and 9 it can be seen that an axial guide device 90 is provided for each of the connecting rods 22 on the movable closure plate 20. This guide device 90 comprises a housing 92 which is rigidly connected to the movable closure plate 20. Within this housing a ring 94 is rotatably mounted. This ring 94 serves as mount for three slide shoes 96. As can be noted from FIG. 2, the three longitudinal grooves 42 on the connecting rods 22 are developed as guide surfaces for these slide shoes 96 and are extended over the rod section A, up to the end plate 24. The connecting rods 22 are accordingly always centered in the locking bushings 34. If the connecting rod 22 is turned for locking around its axis, the ring 94 turns with the slide shoes 96.

FIGS. 11 to 14 show various embodiments of a connecting rod 22 as well as various arrangements of the slide shoes 96 and embodiments of the guide surfaces for the slide shoes 96. In accordance with the embodiment shown in FIG. 11, the connecting rod 22 comprises two longitudinal grooves $42_1$, $42_2$ which divide the outer toothing into two rows of teeth $40_1$, $40_2$. The slide shoes $96_1$, $96_2$ are guided in guide channels in the longitudinal grooves $42_1$, $42_2$. Corresponding to the embodiment shown in FIG. 12, the connecting rod comprises three longitudinal grooves $42_1$, $42_2$, $42_3$ which divide the outer toothing into three rows of teeth $40_1$, $40_2$, $40_3$. The guide surfaces for the slide shoes $96_1$, $96_2$, $96_3$ are developed as flat surfaces which are at an angle of 120° to each other. The embodiment in accordance with FIG. 13 differs from the embodiment of FIG. 12 in the manner that the connecting rod 22 has four guide surfaces $42_1$, $42_2$, $42_3$, $42_4$ which are at an angle of 90° to each other. In accordance with FIG. 14, the outer toothing is divided by six longitudinal grooves into six rows of teeth; however only every second longitudinal groove is developed as guide surface for a slide shoe $96_1$, $96_2$, $96_3$. It is obvious that larger closing units require more rows of teeth and slide shoes than smaller closing units do.

On the basis of FIGS. 15 to 20, the design of the pitch of the thread 50 for the taking up of the axial flank clearance S will be explained in further detail. These figures show in each case a 180° development of the outer and inner toothings of FIGS. 3 and 4. There can be noted two of the three rows of teeth of the inner toothing of the locking bushing and one of the three rows of teeth of the outer toothing of the connecting rod. The teeth of the outer toothing are shown hatched. The following designations are used in the drawings:

P: pitch of the outer toothing on the connecting rod 22, or of the inner toothing on the locking bushing 34;

D: average tooth width;

S: axial flank clearance between inner toothing and outer toothing;

P': pitch of the screw thread 50 between connecting rod 22 and piston 28.

Figure 15:
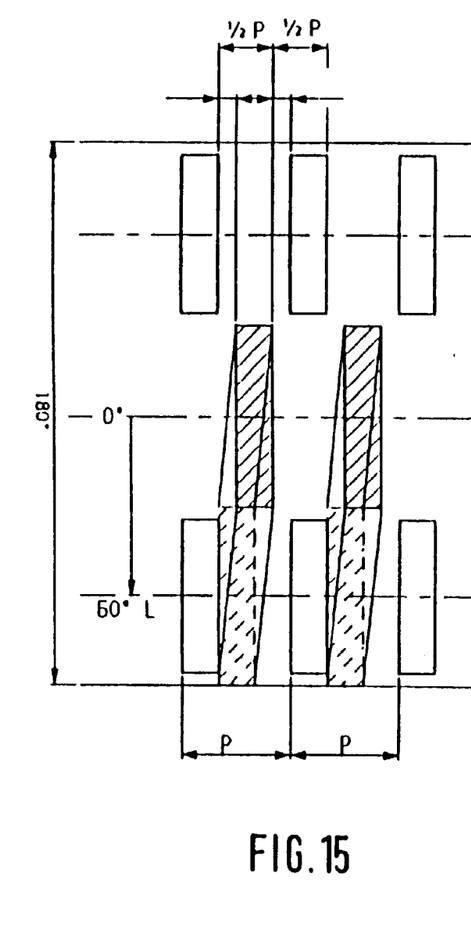
FIGS. 15 to 20 are 180° developments of the toothings on the connecting rod and the locking bushing.
Figure 16:
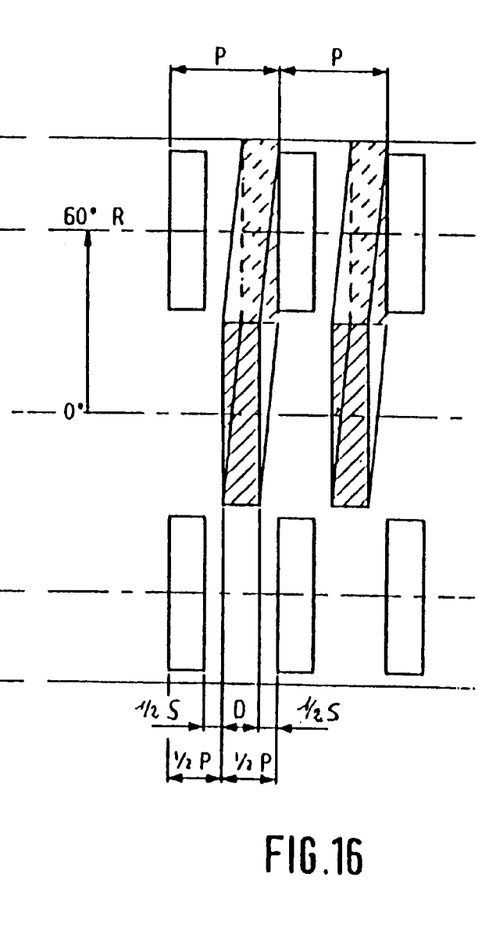
Figure 17:
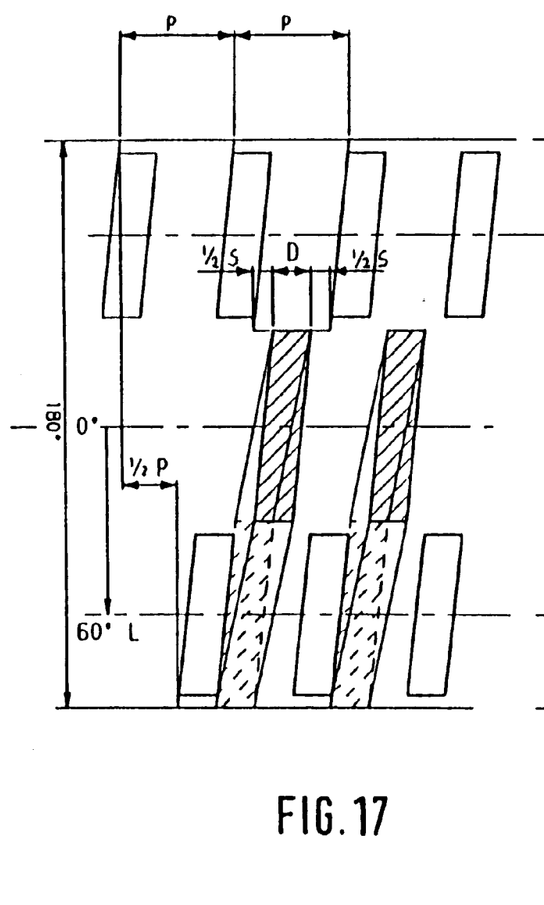
Figure 18:
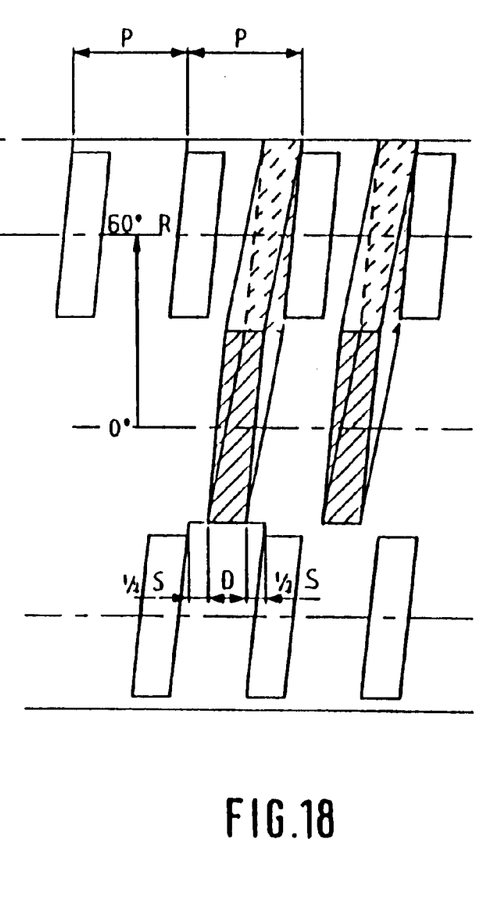
Figure 19:
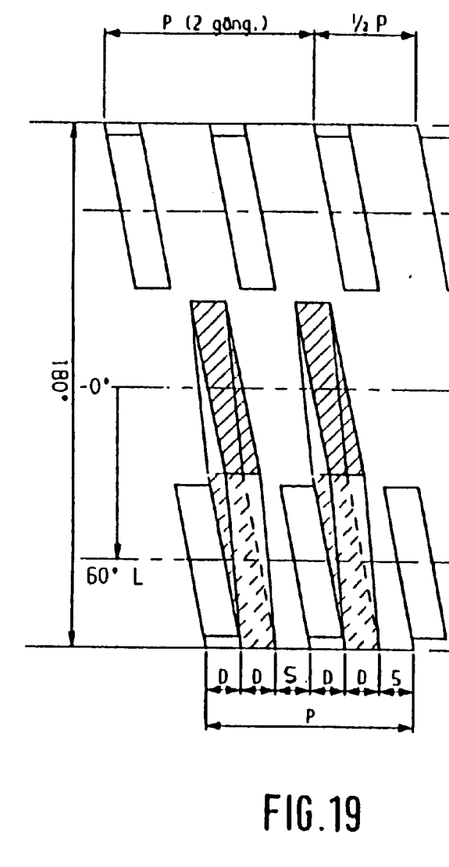
Figure 20:
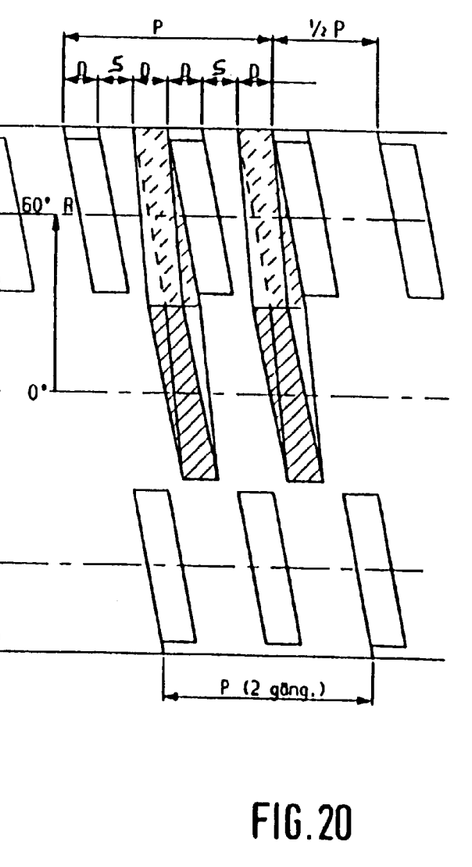

FIGS. 15, 17 and 19 show the position of the outer toothing before and after a 60° rotation of the connecting rod in counterclockwise direction. Before the 60° rotation, the teeth of the outer toothing lie in a first angular position in the longitudinal grooves between the rows of teeth of the inner toothing. After this 60° rotation in counterclockwise direction, the teeth of the outer toothing lie in the second angular position with their left flanks against the teeth of the inner toothing and can transmit a force to the left without play from the connecting rod to the locking bushing. FIGS. 16, 18, and 20 show the position of the outer toothing before and after a rotation of the connecting rod by an angle of 60° to the right. Before the 60° rotation, the teeth of the outer toothing lie in a first angular position in the longitudinal grooves between the rows of teeth of the inner toothing. After this 60° rotation in clockwise direction, the teeth of the outer toothing lie in a second angular position with their right flank against the teeth of the inner toothing and can without play transmit a force to the right from the connecting rod to the locking bushing. For the designing of the pitch of the thread 50 for the taking up of the axial flank clearance S, it is assumed that, in the starting position, before the turning of the connecting rod, the rows of teeth of the outer toothing are in each case angularly precisely in the center between the rows of teeth of the inner toothing, and that the axial flank clearance S between inner toothing and outer toothing is distributed equally on both sides.

In the general case, the pitch of the screw thread is so designed that by turning the connecting rod from the first angular position into the second angular position, the existing flank clearance S between inner and outer toothings is distributed on one side in such a manner that no essential flank clearance is present any longer between the tooth flanks which are to transmit force.

FIGS. 15 and 16 refer to the case of an annular toothing. The pitch of the screw thread 50 is so designed that, by turning the connecting rod from the first angular position into the second angular position, the advance of the connecting rod corresponds approximately to half of the flank clearance S between inner and outer toothings, i.e.:

$P'/6=0.5S$ or $P'=3S$;

for the special case that S=0.5D, i.e. S=P/5, we have accordingly:

$P'=0.6P.$

FIGS. 17 and 18 refer to the case of a helical toothing which ascends in direction of rotation of the locking bushing in the direction of the force to be transmitted. If it is assumed that the pitch P' of the screw thread also ascends in the direction of rotation of the locking bushing in the direction of the force to be transmitted, then the advance X of the connecting rod must correspond approximately to half of the flank clearance S between inner and outer toothings plus one-sixth of the pitch P of the toothing, i.e.:

$P'/6=0.5S+P/6$ or $P'=3S+P.$

For the special case of S=P/5, i.e. S=0.5D, we have accordingly:

$P'=1.6P.$

FIGS. 19 and 20 refer to the case of a helical toothing which has a negative pitch in the direction of turning of the connecting rod in the direction of the force to be transmitted. Furthermore, in FIGS. 19 and 20, the toothing is developed with a double thread, i.e. S=0.5P−2D. If one proceeds from the basis that the pitch P' of the screw thread must have a positive pitch, then the advance X of the locking bushing must correspond approximately to half of the flank clearance S between inner and outer toothings minus one-sixth of the pitch P of the toothing, i.e.:

$P'/6=0.5S-P/6$ or $P'=3S-P;$ for the special case of S=P/10, i.e. D=P/5, we have:

$P'=-0.7P.$

The minus sign in this case means that the screw thread 50 must also have a negative pitch.

Figure 21:
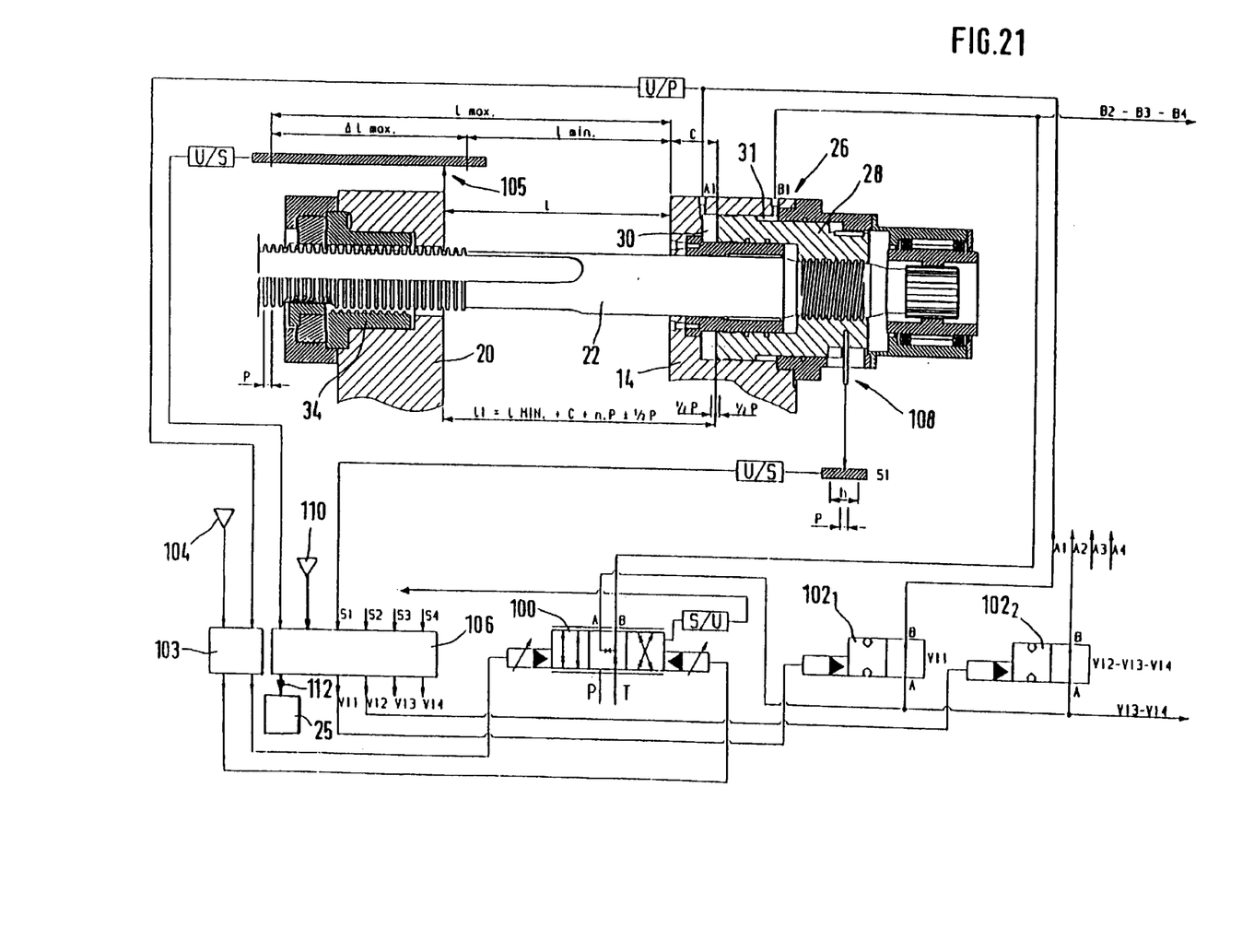
FIG. 21 is a diagram of the hydraulic control of the closing unit.

FIG. 21 shows a block diagram of the hydraulic control of the closing unit 10. A 4/3-way proportional valve 100 has its first work outlet A connected in each case via a 2/2-way switch valve $102_1$, $102_2$, etc. to the first pressure chamber 30 of each of the four force cylinders 28. The 4/3-way proportional valve 100, which is controlled by a controller 103, controls by its work outlet A, upon the closing process, the closing pressure in the first pressure chamber 30 of the four force cylinders 26 as a function of a predetermined closing force 104. The work outlet B of the 4/3-way proportional valve 100 is connected directly to the second pressure chamber 31 of each of the four force cylinders 26.

The closure plate 20 is provided with a position sensor 105 which is connected to an axis control 106. A position sensor 108 is associated with the piston 28 of each force cylinder 26. The output signals S1, S2, S3, S4 of these position sensors 108 are also input values of the axis control 106. The reference numeral 110 indicates an input unit for the length "1" of the injection mold, i.e. the axial distance between closure plate 20 and injection plate 14. This length "1" is set by the axis control 106 via its output 112, the latter controlling the two displacement cylinders 25.

Before the turning of the connecting rod 22 from the first angular position into the second angular position, the teeth of the outer toothing should be positioned precisely axially between the teeth of the inner toothing of the locking bushing 34 in order to permit proper engagement of the outer toothing into the inner toothing upon the turning of the connecting rod 22 into the second angular position. In order to make this axial positioning of the toothings possible independent of the length "1" set, the position of rest of the piston 28, as a function of the length "1" set, is established hydraulically within a range [−0.5P; +0.5P] around a predetermined reference position. In other words, the connecting rod 22 is displaced axially, relative to a reference point, by an amount y, in which connection −0.5P<y<+0.5P. All actual positions of the four pistons 28 are compared for this purpose in the axis control 106 with the calculated desired position. The axis control 106, via the outputs V11, V12, V13, V14 controls the 2/2-way switch valves. If the measured actual position of a piston 28 corresponds to the predetermined desired position, the corresponding 2/2-way valve 102 is closed. This control permits, at little expense, a continuous adjustment of the length "1", regardless of the pitch of the inner and outer toothings. It is pointed out that only one proportional valve is used for the control described above.

What is claimed is:

1. A closing unit of a molding machine having (i) first and second platens which act as clamping plates for a mold, (ii) a displacement device for moving said first and second platens relative to each other, and (iii) a plurality of hydraulic force cylinders on said first platen to produce a closing force, each said force cylinder having a piston connected to a connecting rod for transmitting said closing force to said second platen, comprising:

an actuator associated with said first platen for axially rotating said connecting rods between first and second angular positions;

first locking means along said connecting rods; and second locking means on said second platen, said first and second locking means registering with each other in such a manner that in said first angular position said first and second locking means permit an axial displacement of said second platen relative to said connecting rods and in said second angular position, said first locking means engages said second locking means for the transmission of said closing force.

2. A closing unit according to claim 1, wherein:

said first locking means includes at least two rows of outwardly extending teeth on said connecting rod separated by a longitudinally extending groove;

said second locking means includes a locking bushing having at least two rows of inwardly extending teeth separated by a longitudinally extending groove; and wherein said first angular position, said rows of outwardly and inwardly extending teeth are relatively axially movable respectively along said longitudinal grooves in said second and said first locking means to permit axial displacement of said second platen relative to said connecting rods and, in said second angular position, said inwardly extending teeth engage said outwardly extending teeth to transmit said closing force.

3. A closing unit according to claim 2, wherein an axial flank clearance which corresponds approximately to half of an average width of a tooth is present between said outwardly and said inwardly extending teeth.

4. A closing unit according to any one of claims 2 or 3, wherein said inwardly and said outwardly extending teeth are arranged annularly.

5. A closing unit according to any one of claims 2 or 3, wherein said inwardly and said outwardly extending teeth are arranged helically.

6. A closing unit according to any one of claims 2 or 3, wherein said inwardly and said outwardly extending teeth have a trapezoidal cross section.

7. A closing unit according to any one of claims 2 or 3, wherein a piston of said hydraulic force cylinder is connected via a screw thread to said connecting rod, said piston being secured against rotation, so that by the turning of the connecting rod from said first angular position to said second angular position, said connecting rod advances relative to said piston.

8. A closing unit according to claim 7, wherein said actuator can turn said connecting rods either way from said first angular position, to advance or retract said connecting rods relative to said piston.

9. A closing unit according to claim 7, wherein the pitch of said screw thread is such that by turning said connecting rod from said first angular position to said second angular position, said existing flank clearance between said inwardly and outwardly extending teeth is substantially eliminated between respective flanks of said inwardly and said outwardly extending teeth which are to transmit said closing force.

10. A closing unit according to claim 7, wherein the pitch of the screw thread is designed in such a manner that turning the connecting rod from the first angular position into the second angular position causes the connecting rod to advance by an amount which corresponds to approximately one half of said flank clearance.

11. A closing unit according to claim 3, wherein said inwardly and said outwardly extending teeth form a thread having a pitch which causes said flank clearance to be substantially taken up as said connecting rod is rotated between said first and second angular positions.

12. A closing unit according to claim 11, wherein said inwardly and outwardly extending teeth form a thread, and wherein turning the connecting rod in either direction from said angular position into said second angular position, causes said flank clearance to be substantially taken up.

13. A closing unit according to claim 12, wherein said thread is developed as a double thread.

14. A closing unit according to claim 2, wherein said locking bushing is so arranged on said second platen that it is under tensile stress upon transmission of said closing force.

15. A closing unit according to claim 14, wherein said connecting rod has an elastic limit which is about 20% greater than that of said locking bushing, and wherein said connecting rod and locking bushing are so dimensioned as to have average tensile stresses respectively thereupon during transmission of said closing force which are approximately equal.

16. A closing unit according to any one of claims 14 or 15, wherein the length of a base of said inwardly extending teeth is equal to the length of a base of said outwardly extending teeth.

17. A closing unit according to any one of claims 14 or 15, wherein said inwardly extending teeth have a smaller flank surface than said outwardly extending teeth and said outwardly extending teeth are of a greater hardness than said inwardly extending teeth.

18. A closing unit according to claim 2, further comprising a first platen to which said connecting rods are mounted and with respect to which said connecting rods are rotatable and axially displaceable.

19. A closing unit according to claim 2, wherein said second platen has turnably mounted slide shoes which act as a radial guide for said connecting rods, said longitudinal grooves between said rows of outwardly extending teeth forming guide surfaces for said slide shoes, said guide surfaces extending longitudinally beyond said outwardly extending teeth, and said slide shoes being turnable with said connecting rod.

20. A closing unit according to claim 1, wherein each said actuator has a common rack for simultaneously rotating two of said locking bushings.

21. A closing unit according to claim 20, wherein said rack has a cylinder bore at each end, a fixed piston sealingly engages each of said two cylinder bores so that said rack is displaceable axially back and forth between said two fixed pistons, and pressurized fluid may be introduced between said pistons and said cylinder bores so that two oppositely directed pressure cylinders are formed for the displacement of the rack.

22. A closing unit according to claim 21, wherein each said piston has an axial channel extending therethrough for admitting said pressurized liquid between said cylinder bore.

23. A closing unit according to any one of claims 20, 21, or 22, further comprising a drive bushing with outer toothing which meshes with said rack, said drive bushing being rotatably mounted in a housing, having an opening for the axial introduction of said locking bushing, and coupling means for imparting rotation from said drive bushing to said locking bushing, said coupling means further permitting axial displacement of said connecting rod in said drive bushing.

24. A closing unit according to claim 23, wherein said coupling means comprises a spline-shaft connection.

25. A closing unit according to claim 1, wherein said force cylinders comprise double-acting annular pressure cylinders each having a first pressure chamber for locking said injection mold and a second pressure chamber for opening said injection mold.

26. A closing unit according to claim 25, further comprising a 4/3-way proportional valve with a first work outlet and a second work outlet, said first work outlet being connected via respective 2/2-way valves with said first pressure chambers of said force cylinders and said second work outlet being connected with said second pressure chambers of said force cylinders.

27. A closing unit according to claim 26, further comprising a position sensor for sensing the position of said piston of each said force cylinder, and a control unit which closes each said 2/2-way valve when the position of said piston corresponds to a predetermined position.

28. A closing unit according to claim 27, further comprising a control unit for axially positioning said pistons of said force cylinders in a position of rest in which, upon the turning of said connecting rods from said first angular position into said second angular position, said inwardly extending teeth lie axially between said outwardly extending teeth.

29. A closing unit according to claim 28, further comprising a position sensor for sensing the position of said first platen, a position sensor for sensing the position of said piston of each said force cylinder, a calculating unit for calculating said position of rest of said pistons as a function of the position of said first platen, in such a manner that said teeth of said connecting rods lie axially between said teeth of said locking bushings, before engagement thereof, and said control unit receives input from said position sensors of said pistons for positioning each piston into said position of rest.

* * * * *